(12) United States Patent
Pole, II et al.

(10) Patent No.: US 6,272,642 B2
(45) Date of Patent: *Aug. 7, 2001

(54) MANAGING A SYSTEM'S PERFORMANCE STATE

(75) Inventors: Edwin J. Pole, II; Scott R. Rushford, both of Hillsboro, OR (US); Eric S. Swartzendruber, West Lafayette, IN (US); Xia Dai, Fremont, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,896

(22) Filed: Dec. 3, 1998

(51) Int. Cl.⁷ ...................................................... G06F 1/26
(52) U.S. Cl. ............................ 713/300; 713/320; 713/322
(58) Field of Search ................................... 713/300–340; 365/226, 227, 228, 229

(56) References Cited

U.S. PATENT DOCUMENTS

| 4,615,005 | 9/1986 | Maejima . | | |
|---|---|---|---|---|
| 5,222,239 | 6/1993 | Rosch . | | |
| 5,319,772 | 6/1994 | Hwang . | | |
| 5,381,116 | 1/1995 | Nuckolls et al. . | | |
| 5,475,324 | 12/1995 | Tomiyori . | | |
| 5,479,644 | 12/1995 | Hongo . | | |
| 5,652,891 | * | 7/1997 | Kitamura et al. | 713/324 |
| 5,680,594 | * | 10/1997 | Charneski et al. | 713/501 |
| 5,737,616 | * | 4/1998 | Watanabe | 713/340 |
| 5,760,636 | * | 6/1998 | Noble et al. . | |
| 5,922,075 | * | 7/1999 | Bowker | 713/300 |

OTHER PUBLICATIONS

Intel et al., *Advanced Configuration and Power Interface Specification*, Rev. 1.0, Dec. 22, 1996, pp. 2–12–3–22, 4–54–4–59, 9–148–9–153.*

* cited by examiner

*Primary Examiner*—Ario Etienne
(74) *Attorney, Agent, or Firm*—Troop, Pruner & Hu, P.C

(57) ABSTRACT

A system includes a component, a detector adapted to detect generation of a power management event, and a controller adapted to transition the component from a first performance mode to a lower activity state in response to the power management event. The controller is adapted to change a setting of the component to a second, different performance mode while the component is in the lower activity state. The power management event may be generated in response to a change in the system's power source, an over-temperature condition, or a user command.

37 Claims, 7 Drawing Sheets

MANAGING A SYSTEM'S PERFORMANCE STATE

BACKGROUND

The invention relates to managing a system's performance state.

Portable systems, such as portable computers, have steadily become more powerful with improved technology. Still, the processing, storage, and other capabilities of portable systems are limited due to power consumption and heat dissipation constraints. A portable system relies on a battery as its power source when it is not connected to an external power supply such as an AC outlet. As battery life is limited, power consumption in the system is reduced typically by lowering voltage levels of certain components (e.g., the processor) and reducing clock frequencies of these components. For example, the core clock speed of a processor as well as its voltage levels may be reduced to lower the processor's power consumption. This, however, also reduces processor performance.

Portable systems have become increasingly popular as replacements for desktop systems. When used in the office or at a location with access to an external power supply, the portable systems are plugged into the external power supply, either by use of an AC adapter or through a docking station. However, because conventional portable systems typically operate at reduced performance levels due to limitations of the battery and thermal dissipation requirements, performance of portable systems generally lag the typical desktop system. Consequently, a need arises for a solution that would allow portable systems to operate at higher performance levels to approach the performance of desktop systems.

SUMMARY

In general, according to an embodiment, a system includes a component and a detector adapted to detect generation of a power management event. A controller is adapted to, in response to the power management event, transition the component from a first performance mode to a reduced activity state and to change a setting of the component to a second, different performance mode while the component is in the reduced activity state.

Other features will become apparent from the following description and from the claims.

DETAILED DESCRIPTION

According to an embodiment of the invention, multiple performance states may be defined in a system (which may be, as examples, a portable computer, a notebook computer, a hand-held electronic device, and the like) by using a number of different criteria, including core component clock speeds, power supply voltage settings, and the like. Depending on the power consumption desired of the system, the system may be set at one of the multiple performance states. For example, if the system is only powered by battery (such as when the system is being used as a portable unit remotely without access to an external power source), the system is placed in a lower performance state to conserve power. However, if the system is powered by an external power source (such as an alternating current or AC outlet), the system may be placed in a high performance state, in which performance may be maximized subject to thermal dissipation constraints. In this high performance state, additional heat dissipation devices (e.g., fans) may be activated in the system for improved thermal management. Other intermediate performance states may be specified as desired.

According to one embodiment, to transition between the multiple (two or more) performance states, which may be performed by a controller formed of one or more layers (including, for example, software, firmware, and hardware), one or more selected components are placed into a lower or reduced activity mode (e.g., deep sleep or stop grant states if the component is a processor). Components may include a general-purpose or special-purpose processor such as a microprocessor or microcontroller, an application-specific integrated circuit (ASIC), a programmable gate array (PGA), or any other discrete or integrated device in which performance levels may be adjusted. A controller, implemented in software, firmware, and/or hardware, may then control the performance state transitions by, for example, adjusting component clock frequencies and power supply voltage levels. The performance state transitions may be achieved seamlessly and relatively rapidly without user intervention.

Power dissipation of components is proportional to internal clock speed and to the square of core supply voltage. As a component's internal clock speed is reduced, the minimum required core voltage supply level can also be reduced, thereby dramatically reducing the component's power consumption. In the embodiments described below, the performance state of the computer system is changed by changing the processor's core clock frequency and core voltage levels. In the ensuing description, the component in which internal clock speeds and voltage levels are adjusted is the processor, although clock speeds and voltage levels of other components may be varied in further embodiments.

Figure 1:
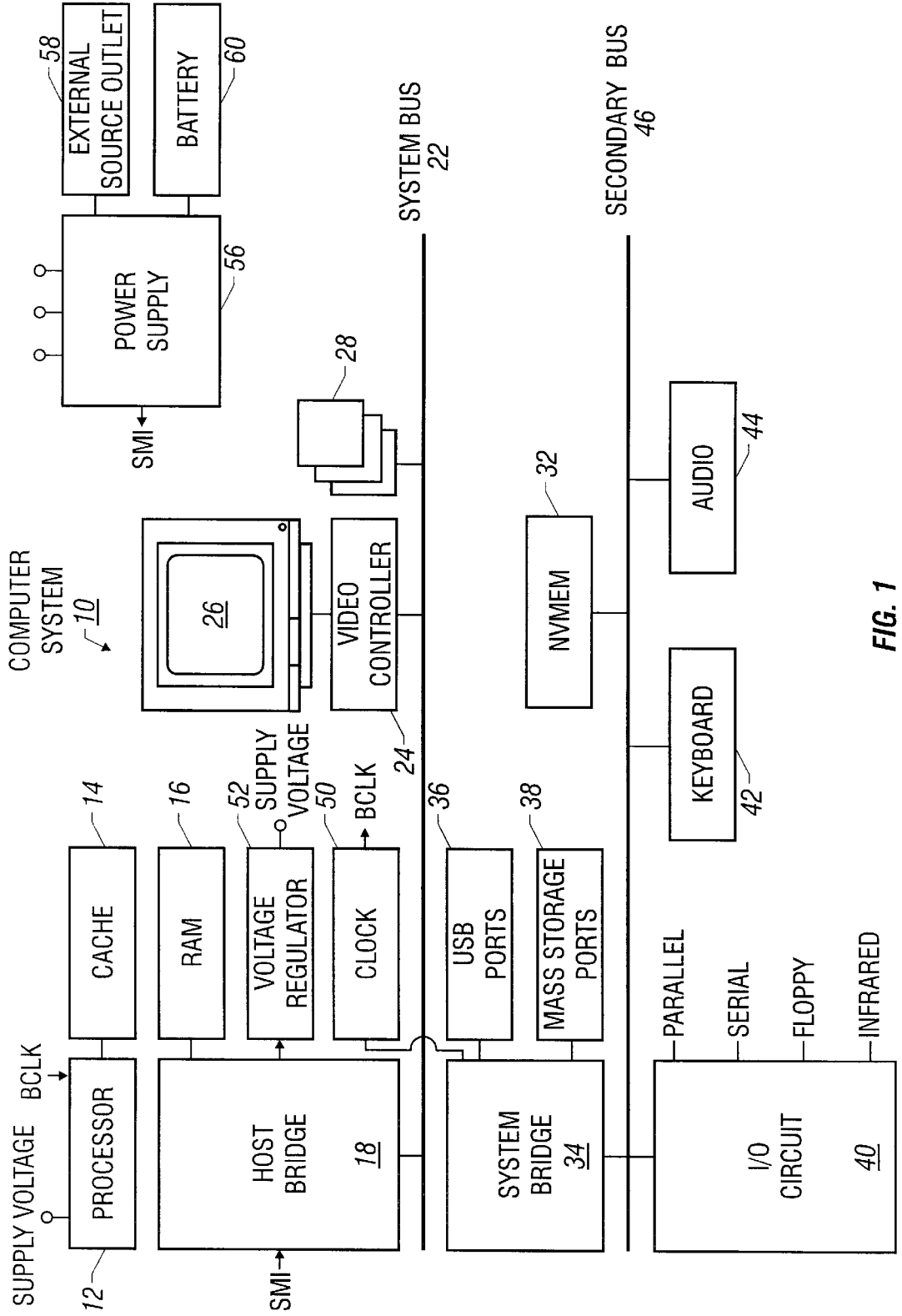
FIG. 1 is a block diagram of a system according to an embodiment of the invention.

Referring to FIG. 1, an example system 10 according to an embodiment of the invention includes a processor 12 (e.g., an 80×86 or Pentium® family processor from Intel Corporation) that receives an external clock BCLK (from a clock generator 50) and a supply voltage (from a voltage regulator 52). The voltage regulator 52 and the clock generator 50 are both controllable to adjust the core voltage levels as well as the core clock frequencies in the processor 12, as further described below.

The main power supply voltages in the system 10 are provided by a power supply circuit 56 that is coupled to a battery 60 or an external power source outlet 58. When the external power source (not shown) is plugged into or removed from the external outlet source 58, an interrupt (e.g., a system management interrupt or SMI) may be generated to notify system software of the external power source insertion or removal. In addition, docking the system 10 to a docking base unit may also indicate a power source transition. In one embodiment, a device driver may detect power source transitions and docking events by registering with the operating system for power and plug-and-play notifications, for example. Thus, depending on whether the system 10 is powered by an internal power source (e.g., battery 60) or by an external power source (e.g., as coupled through the external source outlet 58), the system 10 may be set at a suitable performance level. For example, when the external power source is coupled, the system 10 may operate at a higher performance mode; however, if the internal power source is coupled instead, then the system 10 may operate at a lower performance mode.

Additionally, the computer system 10 may provide a graphical user interface through which a user may specify the desired performance state of the system.

The processor 12 may be coupled to a cache memory 14 as well as to a host bridge 18 that includes a memory controller for controlling system memory 16. The host bridge 18 is further coupled to a system bus 22, which may in one embodiment be a Peripheral Component Interconnect (PCI) bus, as defined in the PCI Local Bus Specification, Production Version, Rev. 2.1, published on Jun. 1, 1995. The system bus 22 may also be coupled to other components, including a video controller 24 coupled to a display 26 and peripheral slots 28.

A secondary or expansion bus 46 may be coupled by a system bridge 34 to the system bus 22. The system bridge 34 includes interface circuits to different ports, including a universal serial bus (USB) port 36 (as described in the Universal Serial Bus Specification, Revision 1.0, published in January 1996) and ports that may be coupled to mass storage devices such as a hard disk drive, compact disc (CD) or digital video disc (DVD) drives, and the like.

Other components that may be coupled to the secondary bus 46 include an input/output (I/O) circuit 40 coupled to a parallel port, serial port, floppy drive, and infrared port. A non-volatile memory 32 for storing basic input/output system (BIOS) routines may be located on the bus 46, as may a keyboard device 42 and an audio control device 44, as examples. It is to be understood, however, that all components in the system 10 are for illustrative purposes and the invention is not limited in scope to the illustrated system.

Various software or firmware layers (formed of modules or routines, for example), including applications, operating system modules, device drivers, BIOS modules, and interrupt handlers, may be stored in one or more storage media in the system. The storage media includes the hard disk drive, CD or DVD drive, floppy drive, non-volatile memory, and system memory. The modules, routines, or other layers stored in the storage media contain instructions that when executed causes the system 10 to perform programmed acts.

The software or firmware layers can be loaded into the system 10 in one of many different ways. For example, code segments stored on floppy disks, CD or DVD media, the hard disk, or transported through a network interface card, modem, or other interface mechanism may be loaded into the system 10 and executed as corresponding software or firmware layers. In the loading or transport process, data signals that are embodied as carrier waves (transmitted over telephone lines, network lines, wireless links, cables, and the like) may communicate the code segments to the system 10.

In the description that follows, reference is made to specific signals and circuitry as well as to sequences of events—it is to be understood that the invention is not limited in scope to the illustrated embodiments.

Figure 2:
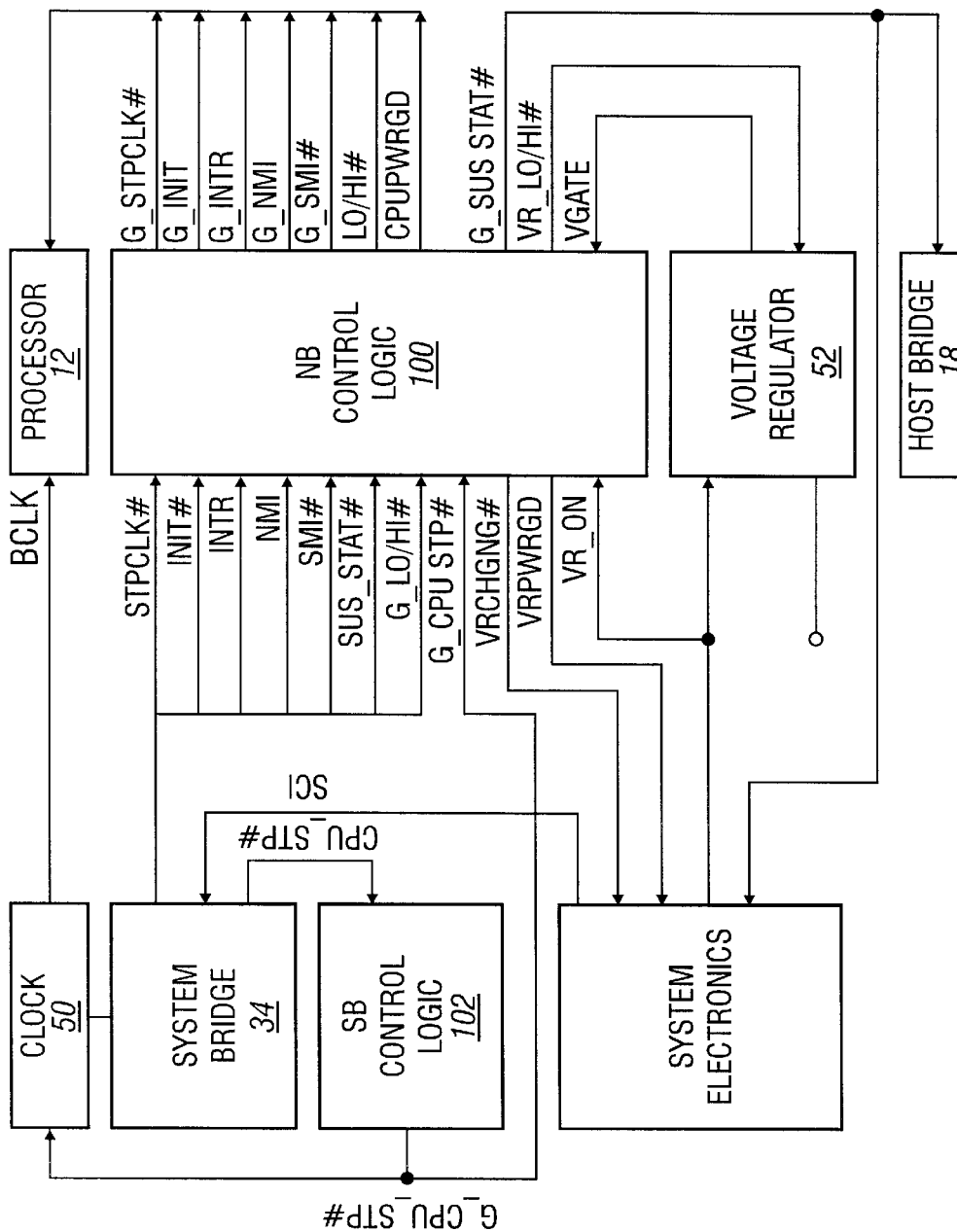
FIG. 2 is a block diagram of power management control logic in the system of FIG. 1.

Referring to FIG. 2, power management control logic according to an embodiment of the invention for controlling the core clock frequency and the supply voltage level of the processor 12 is shown. In the illustrated embodiment, the control logic may be separated into a first portion 100 and a second portion 102. However, it is contemplated that the control logic may also be integrated in one component. The first control logic portion 100 may be included in the host bridge 18, and the second control logic portion 102 may be included in the system bridge 34. Alternatively the first and second control logic portions may be implemented as separate chips. In addition, instead of being configured with host and system bridges 18 and 34 as illustrated in FIG. 1, the circuitry may be implemented as a memory hub (including interfaces to the processor and system memory) and an input/output (I/O) hub (including interfaces to the system bus and secondary bus). In this other configuration, the control logic 100 and 102 may be implemented in the memory hub. With the memory and I/O hubs, messages rather than signals may be used to provide the same functionality as the control logic 100, 102. For example, the I/O hub may send a "Prepare for Deep Sleep" message to the memory hub. Alternatively, a serial link may be used for communication with the voltage regulator 52 and clock generator 50.

The power management control logic (100, 102) provides control signals to the voltage regulator 52 to adjust its voltage levels and to the processor 12 to adjust the processor's internal clock frequency. In addition, the power management control logic (100, 102) is responsible for placing the processor 12 into a low activity state to transition the system to a different performance state.

The core or internal clock frequency of the processor may be varied by changing a setting in the processor. In one embodiment, one of several values may be provided to the processor through input pins, which may be sampled by the processor when it is in a low activity state or when it is in reset. The value sampled by the processor may in one embodiment represent bus fraction data specifying the ratio of the processor's core clock to an external clock, such as BCLK. In one embodiment, the frequency of the external clock can remain the same while the internal clock frequency is changed.

Figure 7:
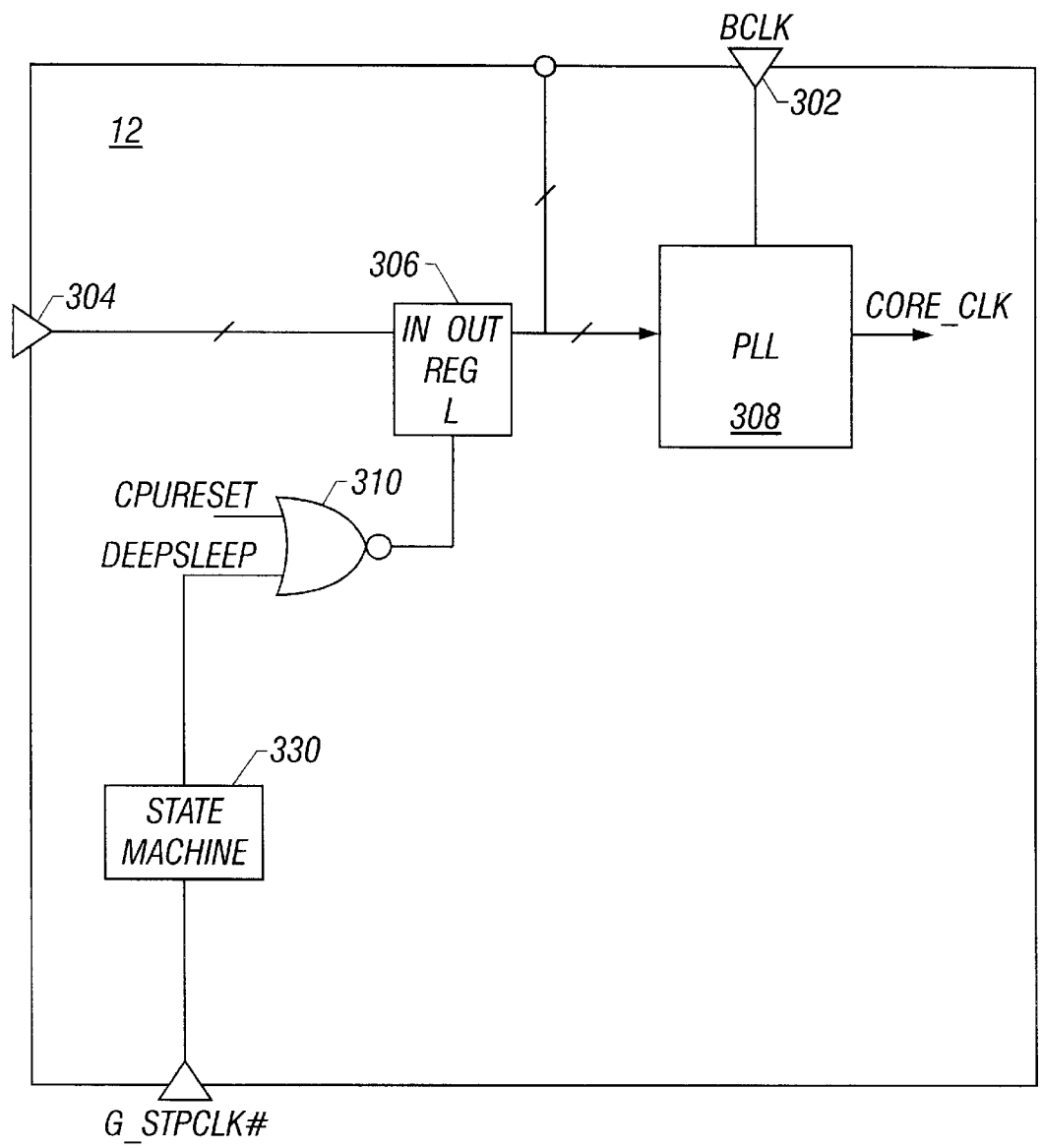
FIG. 7 is a block diagram of circuitry that has one capability to adjust a core clock frequency of a component in the system of FIG. 1 according to an embodiment of the invention.

One such embodiment is disclosed in FIG. 7, in which the processor 12 includes a clock generator 308, which may be a phase locked loop (PLL) circuit, for example. In one example configuration, the PLL circuit 308 includes settings that may be varied according to data (which may be bus fraction data, for example) stored in a register 306. The inputs of the register 306 may be coupled to input/output (I/O) pins 304, and the register 306 may have a latch input controlled by a NOR gate 310. Bus fraction data may be presented onto I/O pins 304 and loaded into the register 306 during a low activity state or some other suitable state, e.g., processor reset. The NOR gate 310 receives a signal indicating that the processor 12 is in a low activity state, e.g., stop grant or deep sleep state. In the illustrated example, the signal may be referred to as DEEPSLEEP, although other signal names indicating a low activity state may also be used. The signal DEEPSLEEP is provided by a state machine 330, or alternatively, by an input pin of the processor 12 to indicate when the processor 12 is in a low activity state.

The NOR gate also may receive another signal (e.g., CPURESET) indicating that the processor 12 is in reset. According to the illustrated embodiment, when the output terminal of the NOR gate 310 is low, indicating that the processor 12 is either in reset state or in a low activity state, the register 306 allows the states of I/O pins 304 to flow through the register 306 to a PLL circuit 308. The PLL circuit 308 also receives the external clock BCLK on pin 302 for generating the core clock CORE_CLK. The frequency of the internal clock CORE_CLK is determined by the data stored in the register 306. For example, the data may specify the ratio of the internal clock frequency to the external clock (BCLK) frequency. When the processor 12 is out of reset or the low activity state, the NOR gate 310 asserts its output terminal high to latch the value present on the I/O pins 304. This maintains the core clock frequency until the next change condition is detected.

In further embodiments, the bus fraction settings may be stored in programmable devices in the processor, including, for example, fuse banks or non-volatile memory.

By changing the internal clock speed of the processor rather than the external clock speed the multiple bus fraction data settings of some processors may be used. Further, a wider range of frequency settings may be available for the processor's internal clock as compared to how much an external clock frequency can change.

A brief description of the interface signals between the power management control logic (100, 102) and the other components of the system follows. A signal VR_LO/HI# is provided by the control logic portion 100 to the voltage regulator 52 to adjust the voltage level supplied by the voltage regulator 52 up or down. A signal G_STPCLK# is provided to the processor 12 and a signal G_CPU_STP# is provided to the clock generator 50 to place the processor 12 in a low activity state (e.g., deep sleep or stop grant state) so that the clock frequency and supply voltage level of the processor 12 may be varied. The low activity state may also be defined as any of the C1, C2, and C3 states under the Advanced Configuration and Power Interface (ACPI) Specification, Revision 1.0, published on Dec. 22, 1996. Other low activity states may also be suitable, such as any state in which the internal clock of the processor is stopped but which allows internal settings to be maintained (e.g., values stored in registers and caches).

A signal LO/HI# provided by the control logic portion 100 to the processor 12 determines whether the core clock frequency of the processor 12 is at a high or low level. As an example, the core clock frequency may vary between 350 MHz and 450 MHz depending on whether LO/HI# is active or not. It is noted that additional signals may be used to adjust the core clock frequency to more than two levels. Similarly, additional signals other than VR_LO/HI# may also be used to control the voltage levels provided by the voltage regulator 52. In the illustrated embodiment, a signal G_LO/HI# from the system bridge 34 indicates the desired system state and controls the states of LO/HI# and VR_LO/HI#. Additional signals may be used to define more than two system states.

A signal VRCHGNG# is provided by the control logic 100 to system electronics circuitry (e.g., the host bridge 18 and system bridge 34) to indicate that the voltage level from the voltage regulator 52 is changing. A signal VRPWRGD from the control logic 100 to the system electronic circuit 104 indicates when the output from the voltage regulator 52 is within specification. According to embodiments of the invention, the voltage regulator interface provided by the control logic portion 100 allows the voltage regulator 52 to change settings without causing a power-on reset of the system. As a result, the performance state transition (including adjusting the processor's core clock frequency and voltage level) may be accomplished without resetting the system, which invalidates the system context. Further, according to some embodiments, the internal clock speed of the processor may be changed without changing the clock speed of the clock from the clock generator 50 while the processor is in the low activity state.

According to one embodiment of the invention, when the voltage regulator on signal (VR_ON) is active (which is true whenever the system is on), the voltage regulator 52 settles to the output selected by VR_LO/HI# (a low level or a high level). By way of example, a low supply voltage level may be about 1.3 V while a high supply voltage level may be about 1.8 V. When the outputs of the regulator 52 are on and within specification, the voltage regulator 52 asserts a signal VGATE, which in turn controls the state of the signal VRPWRGD provided by the control logic portion 100 to system electronics circuitry. To prevent a system reset, the signal VRPWRGD is maintained active during the performance state transition by the control logic irrespective of the condition of VGATE.

It is contemplated that when the processor 12 is transitioning from one performance state to another, the voltage regulator output may or may not change, depending on its original level. It is possible that the voltage regulator output level may be valid at both performance states, in which case a voltage level adjustment is not necessary.

Different events may be used to trigger performance state transitions. For example, a user (through a graphical user interface) may specify the performance state of the computer system. Other events may include docking or undocking of the system 10 and the coupling or discoupling of the external source port 58 to an external power source (such as an AC power source). Environmental changes in the system may also trigger a performance state change, including an over-temperature condition where a predefined temperature threshold in a thermal zone of the computer system has been violated. In addition, system usage may be monitored, with events generated to trigger switching to a lower performance state if usage is low, for example.

Performance state change events may be handled a number of different ways. A device driver may be registered to receive such events, for example. Alternatively, such events may generate a system management interrupt (SMI) such that an SMI handler is invoked. In addition, A BIOS routine may be used to respond to a generated power event. Other mechanisms are also possible.

Figure 3:
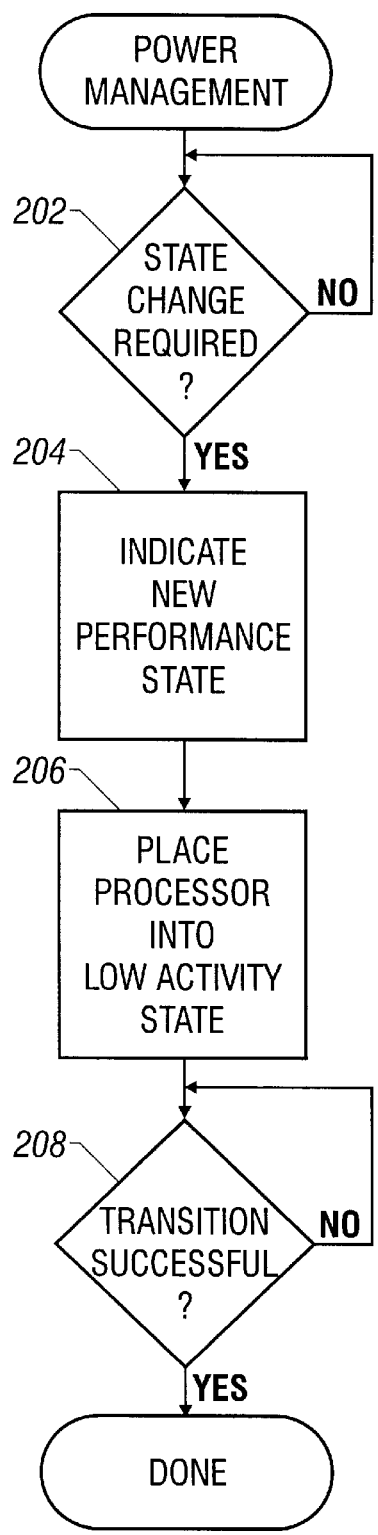
FIG. 3 is a flow diagram of a power management module in the system of FIG. 1.

Referring to FIG. 3, the process executed by a power management module according to one embodiment in the system to control performance state transitions is illustrated. The power management module may be implemented as a software module, in system firmware (e.g., system BIOS or SMI handler), as part of the operating system, as a device driver, or as a combination of the above. The power management module determines (at 202) if a performance state change is to be employed in response to a received event, indicating a power supply transition, docking/undocking, a user command, or other events. Thus, for example, if the system was originally battery operated, and has been plugged into the AC outlet, then the system may transition to a high performance state. If removed from the AC outlet, then the system may transition to a lower performance state. Next, the power management module indicates (at 204) the new performance state of the processor is to transition to. This may be performed, for example, by writing a predefined value to a control register to indicate the new performance state of the processor 12. The control register may be defined in memory or I/O address space. In addition, programming of the control register may be defined under the ACPI Specification. Thus, in one embodiment, one or more ACPI objects may be created to indicate to the operating system that the system is capable of transitioning between or among different performance states and to denote the resources that may be used by the operating system to perform the transitions. The location and structure of the control register may be defined under an ACPI object. Further, one or more ACPI objects may define the number of performance states available, the core clock frequencies and supply voltage levels to be used in the performance states, the expected power consumption in each performance state, and other information.

Next, the power management module places (at 206) the processor 12 into a low activity state (e.g., deep sleep, stop grant, C1, C2, or C3 state). In the deep sleep state, which may be the C3 state defined under the ACPI specification, the external clock BCLK to the processor is disabled so that no activity is performed by the processor except maintenance of the stored data in the processor's internal cache. In the stop grant or C2 state, the processor performs minimal activity, such as snooping for an internal cache line hit to maintain cache coherency. While the processor 12 is in the low activity state, the performance mode of the processor 12 may be changed by, for example, by changing the core processor clock frequency and adjusting the core voltage level. Once the processor 12 has transitioned to the low activity state, the control logic 100 and 102 takes over the performance state transition, as further described below in connection with FIG. 4.

The power management module next determines if the performance state transition was successful (at 208 in FIG. 3). This may be determined by reading a predefined register in the processor 12, which may be a model-specific register (MSR) or the processor's CPU ID register. The predetermined register may be updated by the processor 12 after a transition has been successful. If the transition was successful, then the power management module exits. If unsuccessful, the power management module may time out after a predetermined time period, and a failed indication may be provided.

Figure 4:
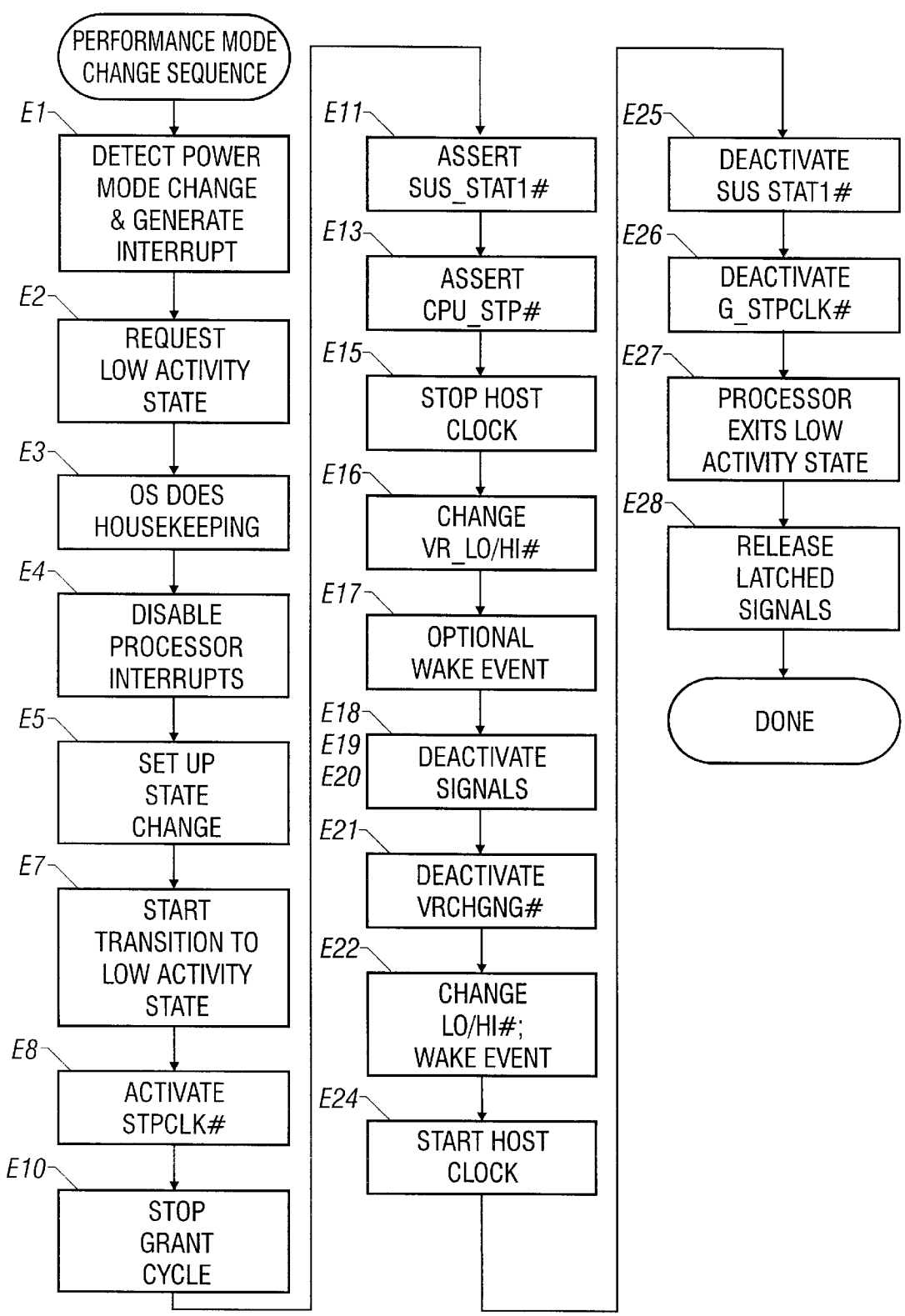
FIG. 4 is a flow diagram of a performance mode change sequence in the system of FIG. 1.

Referring to FIG. 4, the performance state change sequence is illustrated in greater detail. The sequence is performed by a combination of software, firmware, and hardware, including the power management module, the control logic 100 and 102, and other modules. It is contemplated, however, that the sequence may be varied and performed by different system layers and modules. Reference is also made to the timing diagram of FIG. 5, which illustrates relative timings of the signals and events involved in the performance state change sequence.

When the system detects a power mode change (such as in response to the power management module writing to the predetermined control register to indicate the new performance state), an interrupt may be generated (at E1), which may be an interrupt defined by the ACPI specification. When the interrupt handler (e.g., an ACPI driver) is loaded, it recognizes the power mode change and, in response, requests that the operating system place the processor into the low activity state (at E2), which in one example may be the ACPI C3 state. Next, the operating system performs system housekeeping (at E3) and gives control of the system to the interrupt handler.

Next the interrupt handler disables the interrupts to the processor 12 (at E4), although interrupts that may be handled by the system bridge 34 are not affected. It is noted that processor interrupts may not be disabled for more than a predetermined time period (e.g., about 200 microseconds) in order for the performance state transition to be seamless. For example, overrun errors on buffered networks or serial ports may occur if the latency caused by the performance state switching is greater than the predetermined period.

Next, the interrupt handler sets up (at E5) the performance state change by performing an I/O write to a register in the system bridge 34 to control the transition of the signal G_LO/HI#. As illustrated at E6 in FIG. 5, this causes the signal G_LO/HI# from the system bridge 34 to change state. Changing the state of G_LO/HI# is an indication to change performance states.

Next, the interrupt handler initiates (at E7) the transition of the processor 12 to the low activity state, which may in one example be performed by the interrupt handler accessing a predefined register in the system bridge 34, such as performing a memory or I/O read of the level 3 register in the 82371 series of system bridge chips (PIIX3 or PIIX4 chips) from Intel Corporation. In response to the level 3 read, the system bridge 34 activates (at E8) the signal STPCLK# to begin a processor stop clock sequence. This in turn activates (at E9) a signal G_STPCLK# from the control logic portion 100 to the processor 12.

Next, at E10, the processor 12 issues a stop grant cycle in response to detection of the activation of G_STPCLK#. When the system bridge 34 recognizes the stop grant cycle, it asserts a signal SUS_STAT1# (at E11) to the control logic portion 100, which in turn activates a signal G_SUS_STAP1# (at E12) provided to the host bridge 18 that may perform refresh control of system memory 16. In the embodiment in which the processor clock BCLK is disabled, another clock (e.g., a suspend clock) may be needed to perform system memory refresh. Next, the system bridge 34 asserts a signal CPU_STP# (at E13) to the control logic portion 102, which in turn activates a signal G_CPU_STP# (at E14) that is routed to the clock generator 50 and the control logic portion 100. In response to activation of G_CPU_STP#, the clock generator 50 deactivates the host clock (BCLK) at E15. At this point, the control logic portion 100 may latch certain signals which may not be changed during the deep sleep state of the processor 12, such as signals INIT#, INTR, NMI, and SMI# used by the Pentium® family of processors, which are latched as signals G_INIT, G_INTR, G_NMI, and G_SMI# provided to the processor 100. In addition, VRCHGNG# may also be activated at this time.

Figure 5:
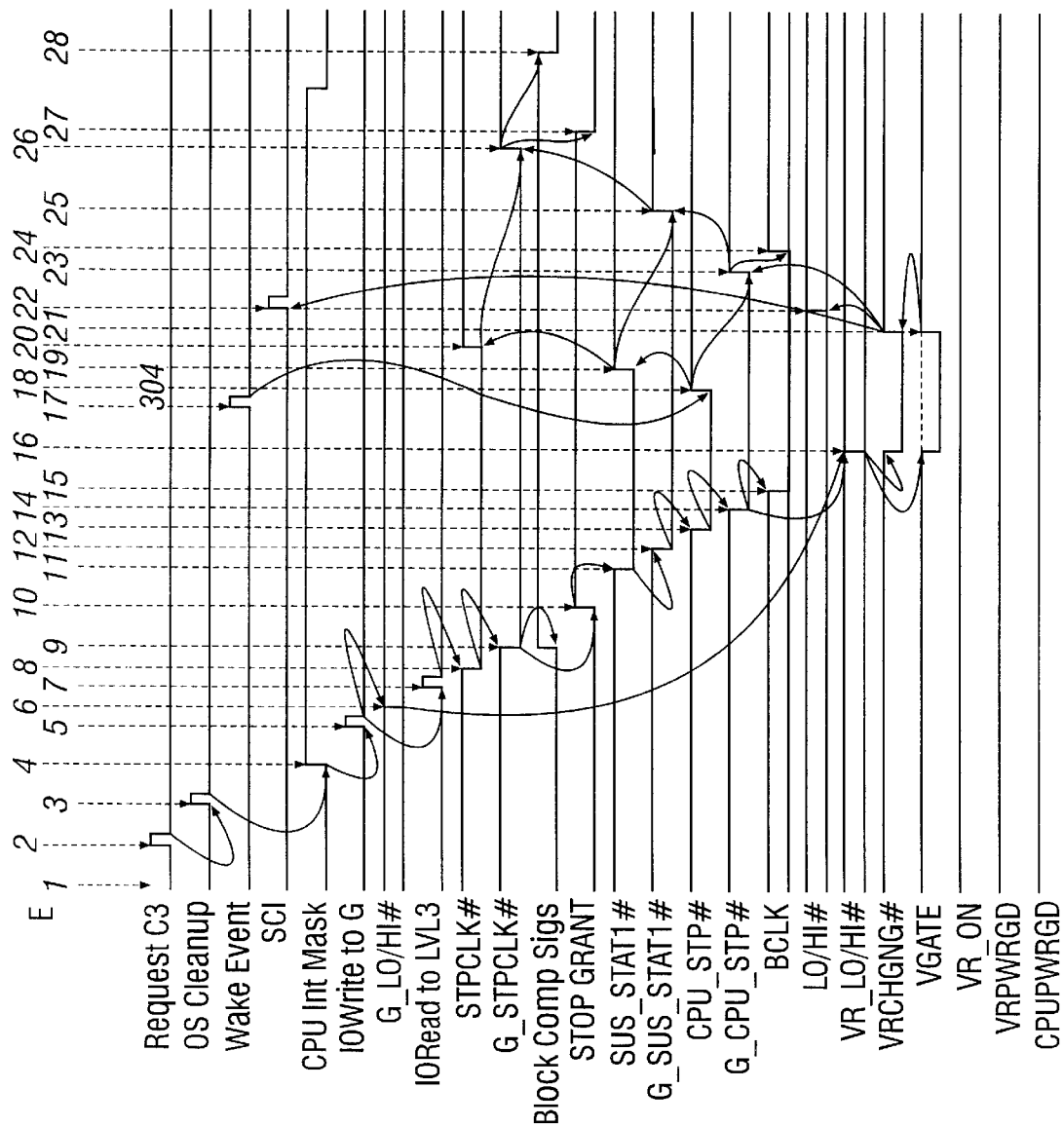
FIGS. 5 and 6 are timing diagrams of signals and events in the performance mode change sequence of FIG. 4.

After a predetermined delay following activation of G_CPU_STP# (e.g., 10 microseconds), the control logic portion 100 changes the state of the signal VR_LO/HI# (if necessary) to begin changing the voltage level of the voltage regulator 52. The predetermined delay is to allow time for the phase locked loop (PLL) circuit in the processor 12 to deactivate. Depending on whether the voltage level of the voltage regulator 52 is within or out of specification, the signal VGATE driven by the voltage regulator 52 may or may not deassert. At this point, the voltage regulator setting is changing, but the processor core clock frequency change does not begin until the voltage level settles. Further, as illustrated in FIG. 5, the power good indications VRPWRGD and CPUPWRGD remain active to prevent system reset.

Next, the interrupt handler may issue an asynchronous wake event (at E18) to initiate system exit from the low activity state. According to an embodiment of the invention, this wake event is optional and may occur any time after activation of G_CPU_STP#. Alternatively, a system controller interrupt (SCI) may be issued to initiate exit from the low activity state. If this is caused by assertion of VRCHGNG#, the overall latency is minimized. If the wake event occurs at E17, which is before the voltage regulator state change and the core processor clock frequency change have completed, the wake event is blocked by latching certain signals in the control logic 100 and 102.

In response to the wake event, the system bridge 34 deactivates the signal CPU_STP# (at E18). However, the signal G_CPU_STP# is maintained latched by the control logic portion 102 to continue in the low activity state. The signals SUS_STAT1# and STPCLK# are also deactivated (at E19 and E20) in response to deactivation of CPU_STP#, but the control logic portion 100 maintains the states of G_SUS_STAT1# and G_STPCLK# latched.

The control logic portion 100 then waits for the signal VGATE to be activated by the voltage regulator 52 (at E21) to indicate that the voltage levels have settled or to wait until a predetermined time period has elapsed (e.g., 100 microseconds) and VGATE is asserted. When either occurs, the control logic portion 100 changes the state of LO/HI# to change the core clock frequency of the processor 12 (at E22) and deasserts VRCHGNG#. By this time, a synchronous wake event (which may be in the form of a system control interrupt or SCI) may be asserted by the system bridge 34 to force the system out of the low activity state. The SCI event is independent of the asynchronous wake event that may be generated at E17. Either one of the wake events may be used. In FIG. 5, generation of the asynchronous wake event at E17 before SCI allows early deactivation of CPU_STP#, SUS_STAT1#, and STPCLK# so that the control logic controls the timing of G_CPU_STP#, G_SUS_STAT1#, and G_STPCLK#.

Next, once VRCHGNG# deasserts to indicate the voltage regulator outputs have settled and if the signal CPU_STP# is inactive, the signal G_CPU_STP# is also deactivated (at E23). When this occurs, the host clock is started by the clock generator 50 (at E24). After the host clock starts, the control logic portion 100 waits a predetermined time period (e.g., greater than 64 microseconds) before deactivating G_SUS_STAT1# (at E25). A predetermined time period after that, the signal G_STPCLK# is deactivated (at E26).

Figure 6:
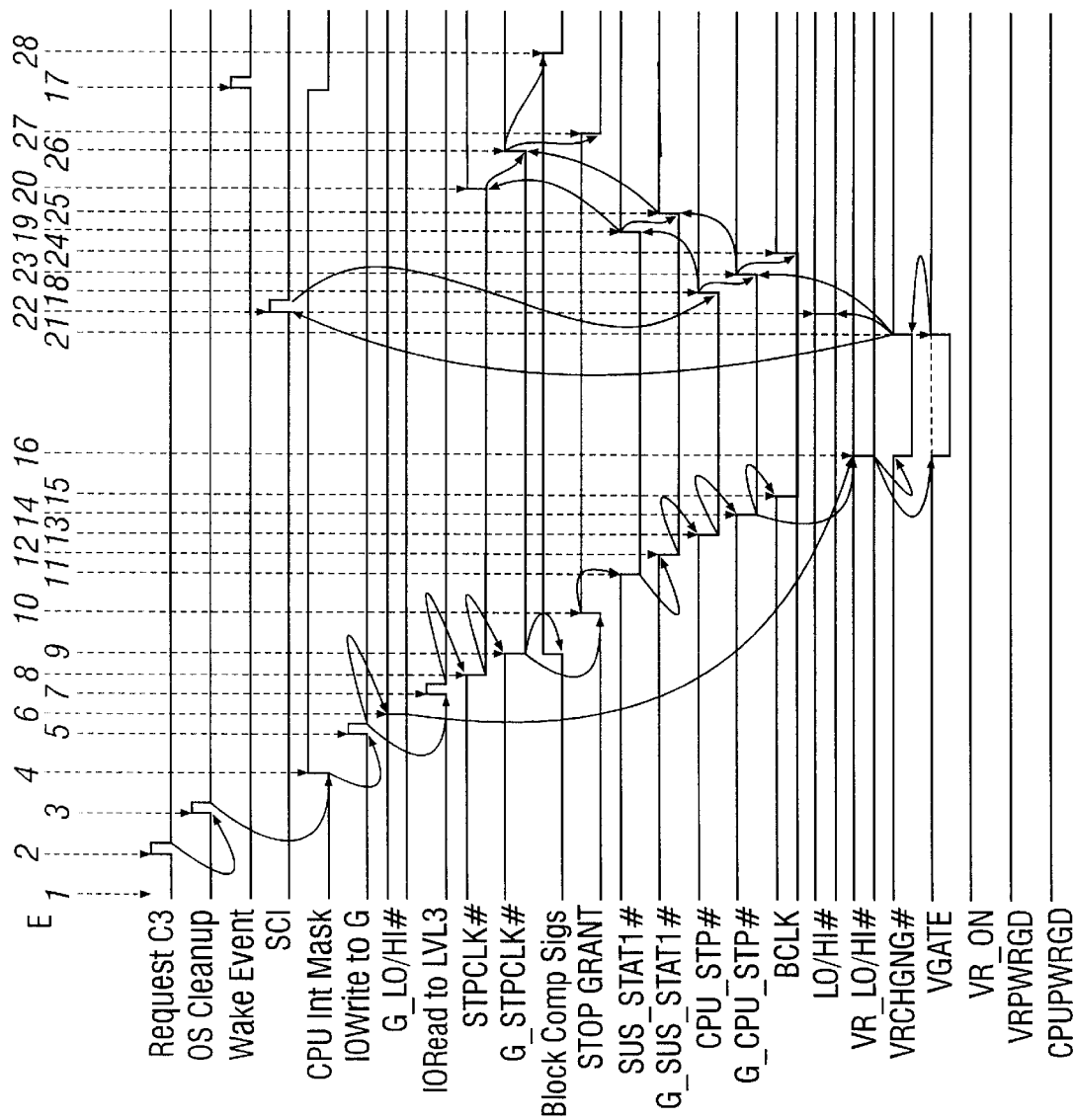

As noted above with reference to FIG. 5, the control logic portion 100 controls the deassertion of the signals G_CPU_STP#, G_SUS_STAT1# and G_STPCLK# since the wake event issued at E17 has already triggered deassertion of the CPU_STP#, SUS_STAT#, and STPCLK# signals. In contrast, in FIG. 6, if the wake event E17 is not issued until much later after the SCI, the interrupt SCI generated at E22 triggers deassertion of STPCLK#, SUS_STAT1#, and CPU_STP#. As illustrated, once VRCHGNG# is deactivated, G_CPU_STP# is not deactivated until after CPU_STP# is deasserted by the system bridge 34 in response to the SCI. Consequently, the sequence of events and signals to wake the processor 12 is changed as shown in FIG. 6.

After the signals G_STPCLK#, G_CPU_STP#, and G_SUS_STAT1# are all deasserted, the processor 12 exits the low activity state (at E27) in the new performance state. Finally the latched signals INIT#, INTR, NMI, and SMI# are released (at E28) and the system is allowed to proceed with normal operations.

After the internal clock frequency and voltage settings have changed, predefined register bits in the processor 12 may be updated that is accessible by software to determine if the performance state change has been successfully made.

The predefined register bits may be mapped to a memory or I/O address of the processor 12, the voltage regulator 52, or a combination of both. Alternatively, the predefined register bits may be found in system memory 16.

A power management control system has been described that controls the switching of a system between or among different performance states in response to predetermined events. The performance state switching is performed after the processor or other component has been placed into a low activity state. An advantage of such a system is that a system reset may be avoided in switching between or among performance states. For example, the internal clock speed of the processor or other component may be varied while it is in the low activity state. In addition, by switching states depending on how the computer system is being utilized (e.g., internal or external power source, high temperature conditions, etc.), system performance may be improved "on the fly" without user intervention.

Other embodiments are within the scope of the following claims. Although one example described involves portable computer systems, the power control system described can be applied to other types of systems. In addition, components (other than a processor) may be transitioned to different performance states to implement other embodiments of the invention. The steps described in the power management sequence may be varied and still achieve similar results.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed:

1. A system comprising:
   a component;
   a detector adapted to detect generation of a power management event; and
   a controller adapted to, in response to the power management event, transition the component from a first internal performance mode to a reduced activity state, and to change a setting of the component to a second, different internal performance mode while the component is in the reduced activity state.

2. The system of claim 1, wherein the component includes a clock set to a first frequency in the first internal performance mode and to a second, different frequency in the second internal performance mode.

3. The system of claim 1, wherein the component includes a supply voltage set to a first level in the first internal performance mode and to a second, different level in the second internal performance mode.

4. The system of claim 3, wherein the controller is adapted to change the supply voltage without resetting the component.

5. The system of claim 1, wherein the reduced activity state includes a deep sleep state.

6. The system of claim 1, wherein the reduced activity state includes the C3 state defined under an Advanced Configuration and Power Interface Specification.

7. The system of claim 1, wherein the component includes an internal clock stopped in the reduced activity state.

8. The system of claim 1, wherein the component includes an external clock stopped in the reduced activity state.

9. The system of claim 1, wherein the power management event includes an event generated in response to a change of power source.

10. The system of claim 9, further comprising an internal power source and an external power source, the controller adapted to select at least one of the first and the second internal performance modes based on which of the internal or external power source is used.

11. The system of claim 1, wherein the controller is partly implemented in software.

12. The system of claim 1, wherein the component is a processor.

13. The system of claim 1, wherein the component has a clock input and at least one other input, the controller to provide a value to the at least one other input to change the setting of the component.

14. The system of claim 13, the component to sample a state of the at least one input while the component is in the reduced activity state.

15. The system of claim 1, wherein the component has a clock input receiving an external clock, wherein the setting of the component is changed without changing the frequency of the external clock.

16. The system of claim 15, wherein the component further comprises a clock generator to generate an internal clock, a frequency of the internal clock being changed when the setting of the component is changed.

17. An apparatus to adjust power states of a system including a component having a clock input to receive an external clock, the component having an internal clock running at a frequency, comprising:
a detector to receive an indication to change power states in the system; and
a controller adapted to place the system into a lower activity state in response to the indication,
the controller adapted to change a setting in the component to change the internal clock frequency without changing a frequency of the external clock to transition the system from one performance state to another performance state while the system is in the lower activity state.

18. The apparatus of claim 17, wherein the internal clock of the component is stopped in the lower activity state.

19. The apparatus of claim 17, wherein the component is set to operate at a first voltage in a first performance state and at a second, different voltage in a second performance state.

20. The apparatus of claim 17, wherein the indication is generated in response to a change in a power source in the system.

21. The apparatus of claim 17, wherein the controller includes a software module.

22. The apparatus of claim 21, wherein the controller further includes hardware control logic responsive to commands from the software module.

23. An article including a machine-readable storage medium containing instructions for controlling power states of a system, the instructions when executed causes a system to:
detect an event generated in response to a predetermined activity;
place a processor in the system into a lower activity state in response to the event; and
change a setting in the processor to transition the processor from a first performance state to a second performance state while the processor is in the lower activity state.

24. The article of claim 23, wherein the storage medium contains instructions for causing the system to further detect a power source change event that indicates a power source of the system has changed.

25. The article of claim 23, wherein the storage medium contains instructions for causing the system to further detect an over-temperature condition event that indicates a temperature in the system has exceeded a predefined threshold.

26. The article of claim 23, wherein a supply voltage of the processor is set to a first level in the first performance state and to a second, different level in the second performance state.

27. The article of claim 23, wherein an internal clock of the processor is set to a first frequency setting in the first performance state and to a second, different frequency setting in the second performance state.

28. The article of claim 23, wherein the processor has a clock input and at least one other input, and wherein the instructions when executed cause the system to provide a value to the at least one other input to change the setting in the processor.

29. The article of claim 23, wherein the processor has a clock input to receive an external clock, the instructions when executed causing the system to change the setting in the processor without changing the external clock.

30. The article of claim 29, wherein the processor has an internal clock, the instructions when executed causing the system to change a frequency of the internal clock to change the setting in the processor.

31. A method of managing a power state of a system, comprising:
detecting a power management event;
placing a processor in the system into a lower activity state in response to detection of the power management event; and
changing a setting in the processor to transition the processor from a first performance state to a second performance state while the processor is in the lower activity state.

32. The method of claim 31, further comprising stopping an internal clock of the processor in the lower activity state.

33. The method of claim 31, further comprising stopping an external clock of the processor in the lower activity state.

34. The method of claim 31, further comprising changing an internal clock frequency of the processor to a different frequency in the transition.

35. The method of claim 31, further comprising changing a supply voltage of the processor to a different level in the transition.

36. The method of claim 31, wherein the processor has a clock input and at least another input, the method further comprising providing a value to the at least another input to change the setting.

37. The method of claim 31, wherein the processor has a clock input to receive an external clock, and wherein changing the setting in the processor comprises changing the setting without clanging a frequency of the external clock.

* * * * *